United States Patent
Kaneko (10) Patent No.: US 12,363,441 B2
(45) Date of Patent: Jul. 15, 2025

(54) IMAGING APPARATUS, METHOD FOR CONTROLLING THE SAME AND STORAGE MEDIUM

(71) Applicant: CANON KABUSHIKI KAISHA, Tokyo (JP)

(72) Inventor: Seigo Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 18/360,709

(22) Filed: Jul. 27, 2023

(65) Prior Publication Data
US 2024/0048860 A1    Feb. 8, 2024

(30) Foreign Application Priority Data
Aug. 3, 2022    (JP) .................. 2022-124336

(51) Int. Cl.
*H04N 23/70* (2023.01)
*G02B 5/20* (2006.01)
(Continued)

(52) U.S. Cl.
CPC ............. *H04N 23/70* (2023.01); *G02B 5/205* (2013.01); *H04N 23/60* (2023.01); *H04N 23/72* (2023.01); *H04N 23/73* (2023.01); *H04N 23/75* (2023.01); *H04N 25/51* (2023.01); *H04N 25/53* (2023.01); *H04N 25/706* (2023.01); *H04N 25/771* (2023.01)

(58) Field of Classification Search
CPC ........ H04N 23/60; H04N 23/70; H04N 23/72; H04N 23/73; H04N 23/75; H04N 25/50–59; H04N 25/706; H04N 25/771; G02B 5/205
See application file for complete search history.

(56) References Cited

U.S. PATENT DOCUMENTS

| | | | |
|---|---|---|---|
| 6,859,230 B2 * | 2/2005 | Luo | H04N 23/73 348/E5.037 |
| 7,430,011 B2 * | 9/2008 | Xu | H04N 23/71 348/E5.037 |

(Continued)

FOREIGN PATENT DOCUMENTS

| | | |
|---|---|---|
| JP | 2010136205 A | 6/2010 |
| JP | 2015121751 A | 7/2015 |

*Primary Examiner* — Lin Ye
*Assistant Examiner* — Chriss S Yoder, III
(74) *Attorney, Agent, or Firm* — Canon U.S.A., Inc. IP Division (57) ABSTRACT

An image capturing apparatus includes an image sensor configured to set an exposure period and a gain individually for each of a plurality of pixel groups, a diaphragm or a neutral density filter configured to adjust a quantity of light incident on the image sensor, at least one processor, and a memory coupled to the at least one processor, the memory having instructions that, when executed by the at least one processor, performs operations as a first control unit configured to control an exposure parameter including at least one of the exposure period and the gain for each of the plurality of pixel groups, and a second control unit configured to control the quantity of light incident on the image sensor by controlling the diaphragm or the neutral density filter based on the exposure parameter controlled by the first control unit.

16 Claims, 6 Drawing Sheets

(51) Int. Cl.
*H04N 23/60* (2023.01)
*H04N 23/72* (2023.01)
*H04N 23/73* (2023.01)
*H04N 23/75* (2023.01)
*H04N 25/51* (2023.01)
*H04N 25/53* (2023.01)
*H04N 25/706* (2023.01)
*H04N 25/771* (2023.01)

(56) References Cited

U.S. PATENT DOCUMENTS

| | | |
|---|---|---|
| 10,397,473 B2 | 8/2019 | Matsuoka |
| 2007/0216958 A1* | 9/2007 | Narukawa ............ H04N 1/0035 358/302 |
| 2018/0013943 A1 | 1/2018 | Yamaguchi |
| 2021/0152721 A1 | 5/2021 | Okamoto |

* cited by examiner

FIG.2

IMAGING APPARATUS, METHOD FOR CONTROLLING THE SAME AND STORAGE MEDIUM

BACKGROUND OF THE INVENTION

Field of the Invention

The present invention relates to an imaging apparatus, a method for controlling the imaging apparatus and a storage medium.

Description of the Related Art

Some of conventional cameras include an optical system having a diaphragm mechanism or a Neutral Density (ND) filter. A subject can be captured with a proper exposure amount by closing the diaphragm when the subject is bright or opening the diaphragm when the subject is dark. This enables improvement in the dynamic range of images to be captured in different frames. The diaphragm mechanism controls (increases or decreases) the quantity of light incident on an image sensor, so that the overall light quantity of an image to be captured is increased or decreased with a similar ratio. The ND filter also increases or decreases the overall light quantity of the image to be captured like the diaphragm mechanism.

Further, there is an image sensor that controls an analog gain or an exposure period for a single pixel or a plurality of pixels. This image sensor sets a proper exposure amount for a single pixel or a plurality of pixels (hereinafter referred to as a "pixel group"), thereby making it possible to improve the dynamic range of an image to be captured in the same frame.

Japanese Patent Application Laid-Open No. 2010-136205 discusses a method for determining an analog gain or an exposure period for a certain aperture value but does not discuss how to control the aperture value when the brightness of a subject changes.

SUMMARY OF THE INVENTION

According to an aspect of the present invention, an image capturing apparatus includes an image sensor configured to set an exposure period and a gain individually for each of a plurality of pixel groups, a diaphragm or a neutral density filter configured to adjust a quantity of light incident on the image sensor, at least one processor, and a memory coupled to the at least one processor, the memory having instructions that, when executed by the at least one processor, performs operations as a first control unit configured to control an exposure parameter including at least one of the exposure period and the gain for each of the plurality of pixel groups, and a second control unit configured to control the quantity of light incident on the image sensor by controlling the diaphragm or the neutral density filter based on the exposure parameter controlled by the first control unit.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings. The following exemplary embodiments are to be considered as illustrative examples for achieving the present invention, and may be corrected and modified as appropriate depending on the configuration of an apparatus to which the present invention is applied and other various conditions. The present invention is not limited to the exemplary embodiments described below. Some of the exemplary embodiments described below may be suitably combined.

Figure 1:
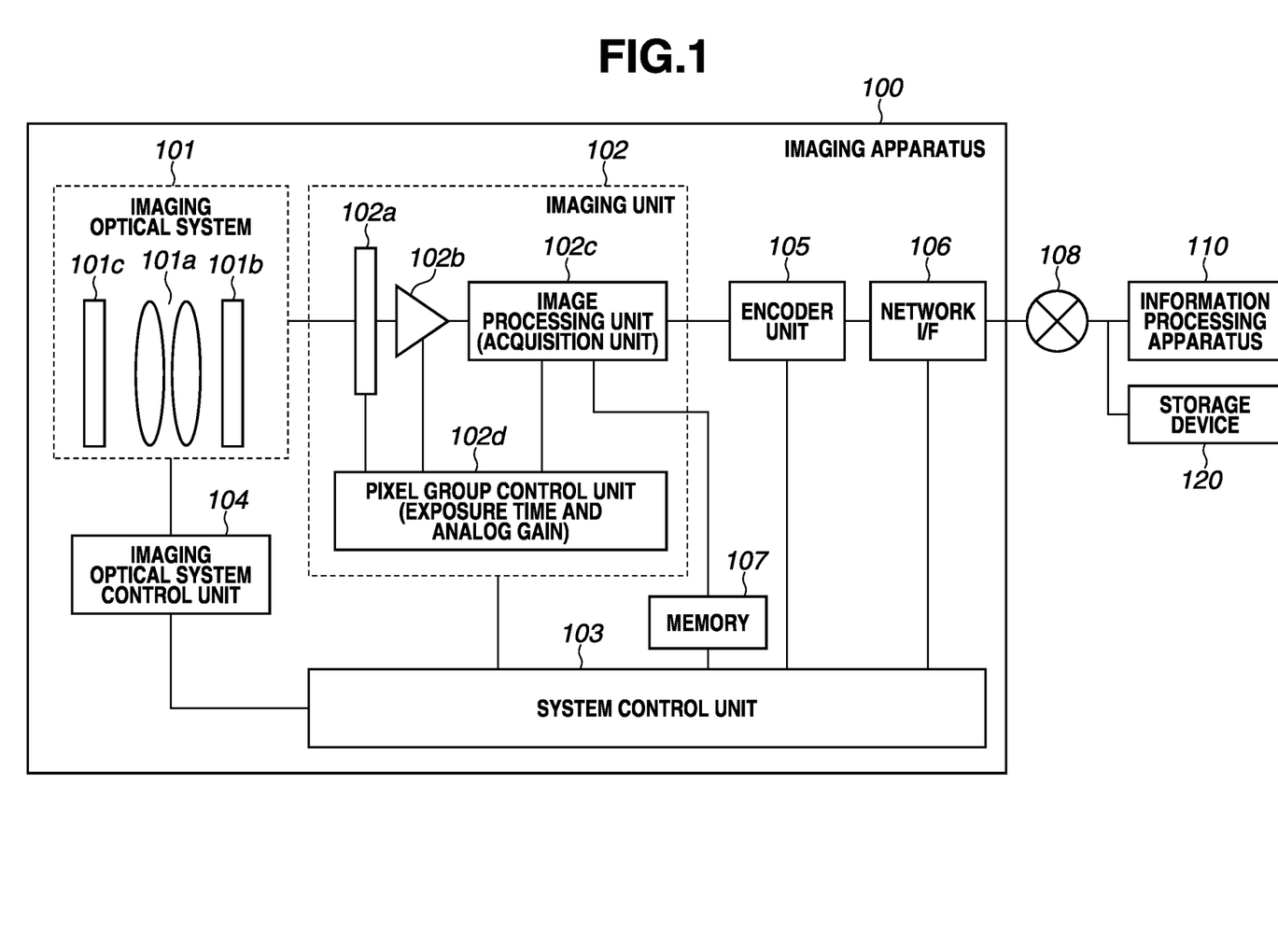
FIG. 1 is a diagram illustrating an example of a functional configuration of an imaging apparatus according to a first exemplary embodiment.

FIG. 1 is a block diagram illustrating an example of a functional configuration of an imaging apparatus 100 according to a first exemplary embodiment.

The imaging apparatus 100 includes an imaging optical system 101, an imaging unit 102, a system control unit 103, an imaging optical system control unit 104, an encoder unit 105, a network interface (I/F) 106, and a memory 107. The memory 107 includes a volatile memory, such as a static random access memory (SRAM) and a dynamic random access memory (DRAM), and a nonvolatile memory, such as a flash memory.

The imaging optical system 101 includes a single or a plurality of lens groups 101a, a diaphragm mechanism 101b, and a Neutral Density (ND) filter 101c.

The imaging unit 102 includes an image sensor 102a, an amplifier 102b, an image processing unit 102c, and a pixel group control unit 102d.

The imaging optical system 101 condenses the light from a subject on the light receiving surface of the image sensor 102a. The lens group 101a includes, for example, a zoom lens, a focusing lens, and an image blur correction lens.

The diaphragm mechanism 101b attenuates the light from a subject. The light (quantity of light) condensed on the light receiving surface of the image sensor 102a is attenuated by the diaphragm mechanism 101b, with a uniform ratio regardless of the light receiving surface. The ND filter 101c attenuates the light from a subject. The diaphragm mechanism 101b and the ND filter 101c have a function of adjusting the quantity of incident light (exposure amount) to the image sensor 102a. More specifically, the exposure amount to the image sensor 102a can be controlled (adjusted) by controlling attachment or detachment of the diaphragm mechanism 101b and/or the ND filter 101c.

Each lens of the lens group 101a, the diaphragm mechanism 101b, and the ND filter 101c are provided with a photo-interrupter and a Hall element for position detection. The imaging apparatus 100 controls the imaging optical system 101 based on positional information from the photo-interrupters and the Hall elements.

The imaging unit 102 captures an image of the subject based on the light incident from the imaging optical system 101 and generates an image. The surface of the imaging unit 102 that receives light is referred to as an imaging plane (light receiving surface). The diaphragm mechanism 101b and/or the ND filter 101c control the exposure amount to the imaging plane.

The image sensor 102a converts the light from the subject, which is condensed on the imaging plane by the imaging optical system 101, into an electrical signal for each pixel, and outputs the signal. The image sensor 102a can set and change at least one of the exposure period and the analog gain for each pixel or each pixel group on the imaging plane. According to the present specification, a pixel group refers to a set of pixels including at least one pixel. A different exposure period and a different analog gain can be set for each pixel group. The image sensor 102a is an Integrated Circuit (IC) chip in which pixels including photoelectric conversion elements are arranged in a matrix form. The image sensor 102a is, for example a Charge Coupled Device (CCD) sensor or a Complementary Metal Oxide Semiconductor (CMOS) sensor. The image sensor 102a is highly sensitive mainly to visible light, i.e., one of red (R), green (G), and blue (B) for each individual pixel, and is also sensitive to infrared light to a certain extent. Thus, the image sensor 102a can clearly capture a subject during hours when there is sunlight, and clearly capture a bright subject under infrared light in a location illuminated by an infrared light illumination.

The amplifier 102b amplifies the electrical signal output from the image sensor 102a and outputs the signal. The signal amplification factor (analog gain) of the amplifier 102b can be set and changed for each pixel or each pixel group of the image sensor 102a.

The image processing unit 102c converts (i.e., performs analog-to-digital (AD) conversion on) the electrical signal that is an analog signal output from the amplifier 102b into a digital signal. The image processing unit 102c subjects the digital signal, which is obtained through the AD conversion, to signal processing such as demosaicing processing, white balance processing, and gamma processing, and generates a digital image. The image processing unit 102c also amplifies or attenuates the digital value of the image signal corresponding to each pixel or each pixel group based on the analog gain for each pixel or each pixel group, thereby correcting the brightness. The generated digital image is temporarily stored in the memory 107. In this case, the image processing unit 102c outputs an image file or video file in a predetermined format, such as Joint Photographic Experts Group (JPEG), H.264, and H.265, to the memory 107. The image processing unit 102c also acquires luminance information for each pixel or each pixel group. The pixel group control unit 102d and the imaging optical system control unit 104 perform Auto Exposure (AE) control based on the luminance information acquired by the image processing unit 102c. In the AE control, the aperture amount associated with the imaging optical system 101 and the exposure period and the analog gain associated with the imaging unit 102 are controlled. The image processing unit 102c also has a function as an acquisition unit for acquiring information about the exposure period and the analog gain to be controlled by the pixel group control unit 102d.

The pixel group control unit 102d controls at least one of the exposure period and the analog gain for each pixel group of the image sensor 102a to change the exposure amount of the imaging unit 102.

Although, in FIG. 1, the amplifier 102b, the image processing unit 102c, and the pixel group control unit 102d are illustrated separately from the image sensor 102a, the image sensor 102a may include some or all of the amplifier 102b, the image processing unit 102c, and the pixel group control unit 102d. The imaging unit 102 may include a processor and a memory element independent of a Central Processing Unit (CPU) 201, a Random Access Memory (RAM) 202, and a Read Only Memory (ROM) 203 illustrated in FIG. 2. The independent processor and memory element can be implemented in one chip as digital circuits stacked in the image sensor 102a.

Although, in FIG. 1, the imaging apparatus 100 includes the imaging optical system 101, the imaging optical system 101 may be configured to be attached to and detached from the imaging apparatus 100, like an interchangeable lens. More specifically, the imaging apparatus 100 does not need to constantly include the imaging optical system 101 as its own component. However, the first exemplary embodiment is applicable only to a case where the imaging apparatus 100 includes the diaphragm mechanism 101b or the ND filter 101c for adjusting the exposure amount. In a case where a detachable interchangeable lens is used, the imaging apparatus 100 and the interchangeable lens are electrically connected with each other, and the imaging apparatus 100 controls the interchangeable lens.

The system control unit 103 includes the CPU 201 (FIG. 2), controls the components of the imaging apparatus 100 in an integrated manner and sets various parameters, e.g., the exposure period and the analog gain.

The system control unit 103 performs overall control in such a manner that the components of the imaging apparatus 100 operate in a collaborative way.

The imaging optical system control unit 104 performs control related to the imaging optical system 101. The imaging optical system control unit 104 drives motors connected to each lens of lens group 101a, the diaphragm mechanism 101b, and the ND filter 101c to control the exposure amount to the image sensor 102a (exposure amount to the imaging plane). The control performed to the diaphragm mechanism 101b and the ND filter 101c is control of the exposure amount. The diaphragm mechanism 101b and the ND filter 101c are adjusted (controlled) to achieve a proper exposure amount for the brightness of the image to be captured. Although the present exemplary embodiment will be described below using an example where the diaphragm mechanism 101b is used to control the exposure amount to the image sensor 102a, the present exemplary embodiment is also applicable to a case where the ND filter 101c is used to control the exposure amount in a similar manner. When the ND filter 101c is used to control the exposure amount to the image sensor 102a, it is desirable to gradually adjust the light reduction amount using a plurality of ND filters 101c or a gradation ND filter.

The diaphragm mechanism 101b can be set to a plurality of diaphragm control values depending on the stop position of the motor. The exposure amount is more attenuated (decreased) as the aperture of the diaphragm further closes.

More specifically, the quantity of light incident on the image sensor 102a can be controlled by controlling the diaphragm mechanism 101b or the ND filter 101c.

The encoder unit 105 encodes image data processed by the image processing unit 102c into a predetermined file format such as Motion Jpeg, H264, and H265.

The network I/F 106 is used in communication with an external information processing apparatus 110 and an external storage device 120 via a network 108. The imaging apparatus 100 transmits the image data having been subjected to the encoding processing by the encoder unit 105 to the external information processing apparatus 110 and the external storage device 120 via the network I/F 106. The network I/F 106 (imaging apparatus 100) receives an instruction (command) to designate an area to be subjected to image recognition and an instruction (command) to designate the type of image recognition from the information processing apparatus 110. The network I/F 106 also receives control commands for controlling panning, tilt, zoom, diaphragm, and exposure of the camera (imaging apparatus 100) from the information processing apparatus 110.

The network 108 is, for example, a Local Area Network (LAN), and includes a router conforming to a communication standard such as Ethernet®. The network 108 is connected with the imaging apparatus 100, the information processing apparatus 110, and the storage device 120 via LAN cables. The network 108 may be connected with the imaging apparatus 100, the information processing apparatus 110, and the storage device 120 via wired connections other than a LAN or wireless connections.

The functional blocks (units 102b to 102d and 103 to 105) illustrated in FIG. 1 are implemented by software. More specifically, programs for implementing the functions of the functional blocks in FIG. 1 are stored in a memory such as the ROM 203 illustrated in FIG. 2. The functional blocks are implemented when the CPU 201 reads the programs into the RAM 202 illustrated in FIG. 2 and then executes the programs. Some or all of the functional blocks may be implemented by hardware. In this case, for example, a dedicated circuit is automatically generated on a Field Programmable Gate Array (FPGA) based on a program for implementing the function of each functional block by using a predetermined compiler. In a similar manner to a FPGA, each functional block may be implemented as hardware by forming a gate array circuit may be formed and implemented as hardware. Some or all of the functional blocks may also be implemented by an Application Specific Integrated Circuit (ASIC).

The configuration of the functional blocks illustrated in FIG. 1 is merely an illustrative example. A plurality of functional blocks may be integrated into one functional block, and one functional block may be divided into a plurality of functional blocks.

Figure 2:
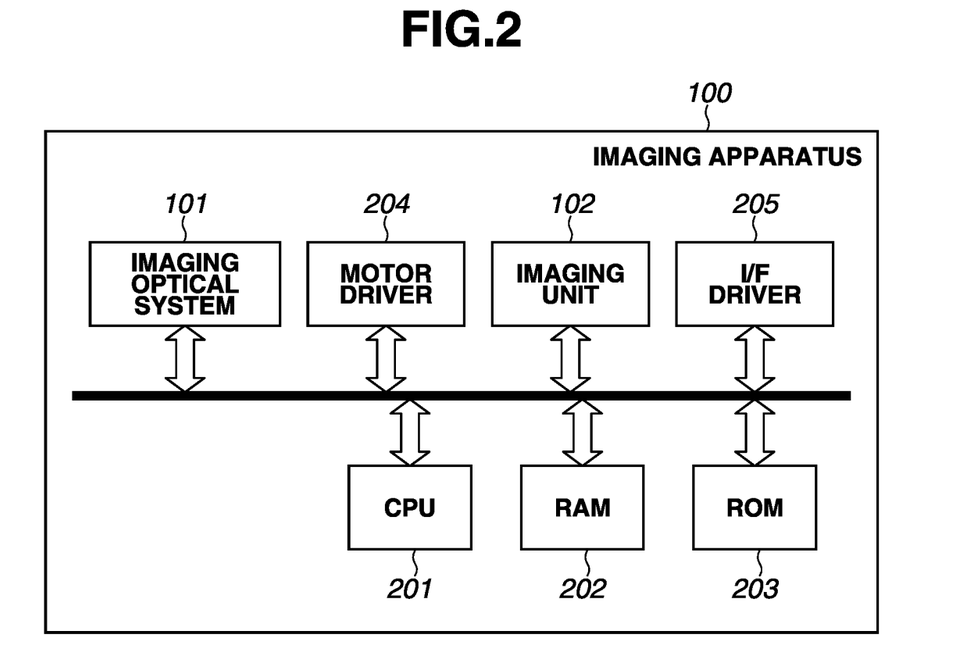
FIG. 2 is a diagram illustrating an example of a hardware configuration of the imaging apparatus according to the first exemplary embodiment.

A hardware configuration of the imaging apparatus 100 will be described below with reference to FIG. 2. FIG. 2 is a block diagram illustrating an example of a hardware configuration of the imaging apparatus 100 according to the present exemplary embodiment. Components the same as those in FIG. 1 are assigned the same reference numerals, and redundant descriptions thereof will be omitted.

The imaging apparatus 100 includes the imaging optical system 101, the imaging unit 102, the CPU 201, the RAM 202, the ROM 203, a motor driver 204, and an I/F driver 205.

The CPU 201 is a central processing unit for controlling the imaging apparatus 100 in an integrated manner.

The RAM 202 temporarily stores a computer program to be executed by the CPU 201.

The RAM 202 also provides a work area used by the CPU 201 to perform processing. The RAM 202 functions as a frame memory and a buffer memory.

The ROM 203 stores programs used by the CPU 201 to control the imaging apparatus 100. The RAM 202 and the ROM 203 correspond to the memory 107 in FIG. 1.

The motor driver 204 drives the motors of the imaging optical system 101. The motor driver 204 receives a drive instruction (signal) from the CPU 201 and drives the motors according to the drive instruction to move each lens of the imaging optical system 101, the diaphragm mechanism 101b, and the ND filter 101c to suitable stop positions.

The I/F driver 205 is a driver for performing communication to implement a connection with an external interface such as Ethernet physical layer (PHY).

Diaphragm control procedures and processing that make it possible for the imaging apparatus 100 to perform image capturing with a proper exposure amount will be described below with reference to the flowchart in FIG. 3.

In step S301, the imaging apparatus 100 performs preliminary image capturing. The exposure amount of the next frame is determined based on image data obtained in the preliminary image capturing. The exposure amount is determined based on a signal amplification factor (Sv value), an exposure period (Tv value), and an aperture value (Av value). The signal amplification factor is an analog gain. Exposure (=Ev value) can be represented by Formula (1) using Sv, Tv, and Av values. The unit of each of the Ev, Sv, Tv, and Av values is the number of steps.

$$Ev \text{ value} = Av \text{ value} + Tv \text{ value} - Sv \text{ value} \qquad (1)$$

The Ev value is an index of brightness. The larger the Ev value is, the smaller the exposure amount is. Accordingly, a large Ev value is suitable for a bright subject. On the contrary, the smaller the Ev value is, the larger the exposure amount is. Accordingly, a small Ev value is suitable for a dark subject. Increasing the Av value means controlling the diaphragm in a closing direction in such a manner that the image is darker. If the Av value is increased, then the exposure amount decreases. Increasing the Tv value means controlling the exposure period to be shorter in such a manner that the image is darker. If the Tv value is increased, then the exposure amount decreases. Increasing the Sv value means controlling the analog gain to be increased in such a manner that the image is brighter. If the Sv value is increased, then the exposure amount increases.

For example, if either one of the Av, Tv, and Sv values is increased by one step, then the Ev value is increased by one step. In other words, if either one of the Av, Tv, and Sv values is increased by one step, the exposure amount can be decreased by one step. Accordingly, it makes it easier to capture a bright subject. Controlling the Av, Tv, and Sv values in this way makes it possible to capture a subject with a proper exposure amount. To simplify the description provided below, an exposure amount X of the imaging unit 102 which can be changed for each pixel group is represented by Formula (2), an exposure amount Y of the imaging optical system 101 as the exposure amount to the imaging unit 102 is represented by Formula (3), and an exposure amount Z as the overall exposure amount of the imaging apparatus 100 is represented by Formula (4). Each of the exposure amounts X, Y, and Z increases as the value increases in the positive direction.

$$X = -Tv \text{ value} + Sv \text{ value} \qquad (2)$$

$$Y = -Av \text{ value} \qquad (3)$$

$$Z = X + Y = -Av \text{ value} - Tv \text{ value} + Sv \text{ value} \; (= -Ev \text{ value}) \qquad (4)$$

An exposure parameter also includes these exposure amounts. As described above, the exposure amount is a parameter indicating the brightness of a subject in a plurality of pixel groups. According to the present exemplary embodiment, the exposure amount can be obtained based on the exposure period (Tv value), the gain (Sv value), and the aperture value (Av value) of each pixel group. Alternatively, the exposure amount may be obtained based on at least one of the exposure period and the gain. This method will be described in detail below in a second exemplary embodiment.

In step S302, the imaging apparatus 100 calculates the average value of luminance for each pixel group of the image sensor 102a based on the preliminarily captured image. This average value is handled as the luminance value of the pixel group.

Although the average value is used as the luminance value of the pixel group in the present exemplary embodiment, the median value, the maximum value, or the minimum value of luminance may be used as the luminance value of the pixel group.

In step S303, the imaging apparatus 100 calculates the exposure amount X for each pixel group. Firstly, the imaging apparatus 100 calculates the ratio of the luminance value for each pixel group obtained in step S302 to a target luminance value. The imaging apparatus 100 calculates the exposure amount X (Sv and Tv values) that enables image capturing to be performed with the target luminance value in the next frame, based on the ratio and the exposure amount X of the preliminary image capturing (previous frame).

The target luminance value is set by the designer or a user, and the target luminance value is, for example, the median value of the dynamic range. When the image sensor 102a having a data amount per pixel of 4,096 (12 bits) is used, the target luminance value is set to around 2,000 that is close to the median value of the dynamic range. Setting the target luminance value in this way enables capturing a subject without saturation (overexposure and underexposure).

For example, in a case where the average luminance value in the pixel group is brighter than the target luminance value by ⅓ steps, an image can be captured with a proper exposure amount by decreasing the exposure amount of the next frame by ⅓ steps. Thus, the imaging apparatus 100 calculates the exposure amount X (Sv and Tv values) by increasing the Tv value by ⅓ steps (or decreasing the Sv value by ⅓ steps).

Instead of adjusting either one of the Tv and Sv values, both the Tv and Sv values may be adjusted to enable image capturing with a proper exposure amount. For example, the imaging apparatus 100 may calculate the exposure amount X by increasing the Tv value by ⅙ steps and decreasing the Sv value by ⅙ steps.

In step S304, the imaging apparatus 100 determines whether the diaphragm operation is stable. More specifically, for example, the imaging apparatus 100 performs the determination by determining whether the operation (e.g., rotational speed) of the motor of the diaphragm mechanism 101b is stable. Since the diaphragm mechanism 101b is driven by a motor, it may take time until the control (motor operation and lens movement) becomes stable. In a case where the diaphragm operation is not stable at the image capture timing, the imaging apparatus 100 may not correctly acquire information about the exposure amount at the image capture timing. For this reason, the imaging apparatus 100 determines whether the diaphragm operation is stable in step S304. In a case where the diaphragm operation is not stable (NO in step S304), the processing proceeds to step S309, and the imaging apparatus 100 does not perform diaphragm control. On the other hand, in a case where the diaphragm operation is stable (YES in step S304), the processing proceeds to step S305. In step S305, the imaging apparatus 100 determines whether to perform diaphragm control.

In step S305, the imaging apparatus 100 compares the exposure amount X for each pixel group with a threshold value to determine whether to perform diaphragm control. More specifically, the imaging apparatus 100 determines whether to control the diaphragm in the opening direction (direction in which the diaphragm opens) or in the closing direction (direction in which the diaphragm closes) depending on whether the exposure amount X exceeds the threshold value. According to the present exemplary embodiment, when the expression "exceeding a threshold value" is used, it means either a case where a value exceeds above the threshold value or a case where a value exceeds below the threshold value.

In a dark region in the pixel group, the Tv and Sv values are set to increase the exposure amount X of the imaging unit 102 in order to perform image capturing with proper exposure. However, there is an upper limit for the settable exposure amount X (=−Tv value+Sv value). Thus, when the exposure amount X reaches the upper limit, the imaging apparatus 100 cannot increase the exposure amount X of the imaging unit 102 any further. Since the settable analog gain or exposure period has limit values (an upper limit and a lower limit), it is desirable to control the quantity of incident light by using a diaphragm mechanism to prevent the analog gain or the exposure period from reaching the limit values during image capturing. For this reason, a threshold value (upper limit threshold value) is set near the upper limit of the exposure amount X. When the exposure amount X exceeds above the threshold value (YES in step S305), i.e., when the exposure amount X nearly reaches the upper limit, the imaging apparatus 100 controls the diaphragm in the opening direction. Since the diaphragm is controlled in the opening direction (the Av value decreases), the exposure amount Y increases, and the exposure amount Z as the overall exposure amount of the imaging apparatus 100 increases. Since the exposure amount X can be decreased by the increased amount of the exposure amount Y, the Tv and Sv values can be set to values below the threshold value. More specifically, the imaging apparatus 100 can adjust the exposure amount such that the Tv and Sv values do not reach the upper limit, thereby making it possible to perform image capturing with a proper exposure amount for each pixel group.

The exposure amount X for a dark region in the pixel group has been described above, and the exposure amount X for a bright region in the pixel group can be considered in a similar way. In a bright region in the pixel group, the Tv and Sv values are set such that the exposure amount X of the imaging unit 102 decreases in order to perform image capturing with proper exposure. However, there is a lower limit for the settable exposure amount X (=−Tv value+Sv value). Thus, when the exposure amount X reaches the lower limit, the imaging apparatus 100 cannot decrease the exposure amount X of the imaging unit 102 below the lower limit. For this reason, a threshold value (lower limit threshold value) is set near the lower limit of the exposure amount X. When the exposure amount X is below the threshold value, i.e., when the exposure amount X nearly reaches the lower limit, the imaging apparatus 100 controls the diaphragm in the closing direction. Since the diaphragm is controlled in the closing direction (the Av value increases), the exposure amount Y decreases, and the exposure amount Z as the overall exposure amount of the imaging apparatus 100 decreases. Since the exposure amount X can be increased by the decreased amount of the exposure amount Y, the Tv and Sv values can be set to values above the threshold value. More specifically, the imaging apparatus 100 can adjust the exposure amount such that the Tv and Sv values do not reach the lower limit, thereby making it possible to perform image capturing with a proper exposure amount for each pixel group.

When the exposure amount X is below the threshold value (NO in step S305), the processing proceeds to step S309. On the other hand, when the exposure amount X exceeds the threshold value (YES in step S305), the processing proceeds to step S306.

In step S306, the imaging apparatus 100 calculates and determines a diaphragm control amount (Av value).

It is desirable that the diaphragm control amount is an amount that can change within a range where the exposure amount X does not exceed the threshold value depending on the amount of change in the exposure amount Y. This enables the number of times of diaphragm control to be reduced.

In step S307, the imaging apparatus 100 controls the motor of the diaphragm mechanism 101b to achieve the diaphragm control amount (Av value) determined in step S306.

In step S308, the imaging apparatus 100 corrects the exposure amount X (Sv and Tv values) calculated in step S303. Since the imaging apparatus 100 performs the diaphragm control in step S307, the exposure amount Y (Av value) changes. To reduce the period of time (the number of frames) until when a proper exposure amount is obtained, the imaging apparatus 100 corrects the exposure amount X so that the exposure amount Z is not changed by the diaphragm control in step S307. For example, when the exposure amount Y of the imaging optical system 101 increases by one step (+1 step), the imaging apparatus 100 corrects the exposure amount X of the imaging unit 102 such that the exposure amount X decreases by one step (−1 step). In a case where the exposure amount X cannot be corrected, it is desirable to correct the brightness of the captured image using a digital gain. Accordingly, it is possible to appropriately set the brightness of the image to be distributed even in a case where the exposure amount X cannot be corrected. However, if the luminance value becomes saturated, the exposure amount X cannot be corrected using the digital gain. Thus, in a case where the exposure amount X cannot be corrected, it is desirable to control the diaphragm within a range where the luminance does not become saturated.

In step S309, the imaging apparatus 100 determines to perform image capturing with the exposure amount X (Sv and Tv values) calculated in step S303 or the exposure amount X (Sv and Tv values) corrected in step S308.

In step S310, the imaging apparatus 100 performs image capturing with the exposure amount X determined in step S309.

In step S311, the imaging apparatus 100 determines whether to end image capturing. For example, when the user issues an imaging end instruction (signal) from the information processing apparatus 110 to the imaging apparatus 100, and the imaging apparatus 100 receives the instruction via the network I/F 106, the imaging apparatus 100 determines to end image capturing. In a case where image capturing is to be ended (YES in step S311), the processing in the flowchart in FIG. 3 is terminated. On the other hand, when image capturing is to be continued (NO in step S311), the processing returns to step S302. In step S302, the imaging apparatus 100 calculates the average value of the luminance for each pixel area of the image sensor 102a based on the image captured in step S310. In the subsequent steps, the imaging apparatus 100 performs control with similar procedures.

In the above-described manner, the imaging apparatus 100 controls the diaphragm based on the exposure parameter including at least one of the exposure period and the gain set for each pixel group. Thus, the generation of noise due to excessive gain and the generation of motion blur due to slow shutter speed are suppressed.

Figure 4:
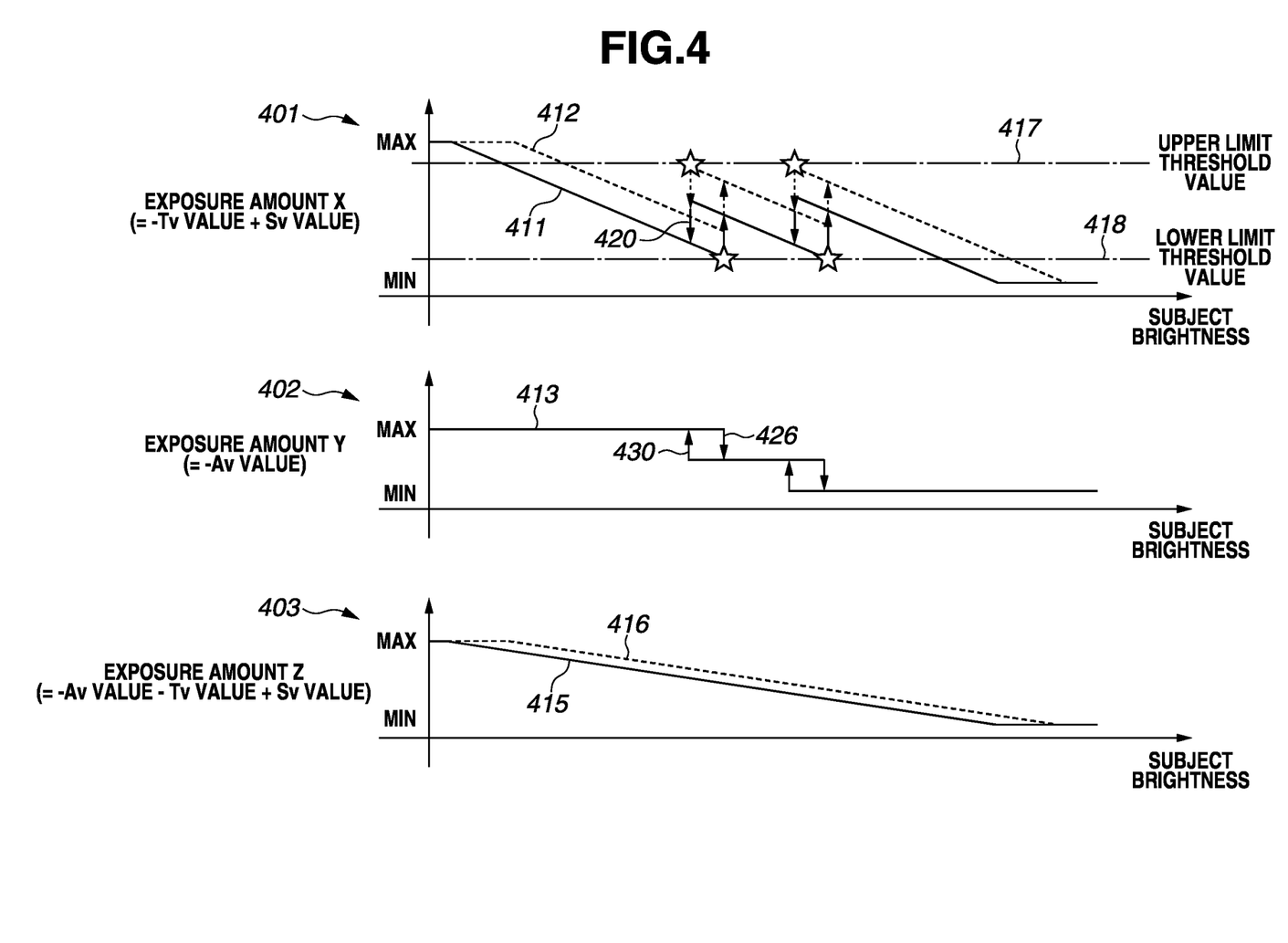
FIG. 4 is a diagram illustrating an example of a relation between an exposure amount and a subject brightness according to the first exemplary embodiment.

The exposure amount will be described below with reference to FIG. 4. FIG. 4 is a diagram illustrating a relation between the exposure amount and the subject brightness according to the present exemplary embodiment. FIG. 4 illustrates three different graphs 401, 402, and 403. The vertical axis of the graph 401 represents the exposure amount X. The vertical axis of the graph 402 represents the exposure amount Y. The vertical axis of the graph 403 represents the exposure amount Z. The horizontal axes of the graphs 401, 402, and 403 each represent the subject brightness in the same scale.

The imaging apparatus 100 determines the exposure amount Z to capture an image with appropriate brightness according to the subject brightness. Thus, when the subject brightness is low (i.e., when the subject is dark), the exposure amount Z (=X+Y) of the imaging apparatus 100 is maximized. When the subject brightness is high (i.e., when the subject is bright), the exposure amount Z (=X+Y) of the imaging apparatus 100 is minimized.

The graph 401 of the exposure amount X illustrates two different lines (a solid line 411 and a broken line 412). The graph 403 of the exposure amount Z also illustrates two different lines (a solid line 415 and a broken line 416). The solid lines 411 and 415 each indicate the exposure amount of the brightest region in the pixel group. The broken lines 412 and 416 each indicate the exposure amount of the darkest region in the pixel group. The exposure amount Y is determined by the diaphragm mechanism 101b of the imaging optical system 101. Thus, the exposure amount Y is uniformly controlled for all of the pixel groups of the image sensor 102a. Since the same exposure amount Y is applied to both a bright region and a dark region, the graph 402 of the exposure amount Y omits the broken line and illustrates only a solid line 413.

Referring to the graph 401 of the exposure amount X, an upper limit threshold value 417 and a lower limit threshold value 418 are drawn with dot-dash lines. The imaging apparatus 100 controls the exposure amount Y with reference to the exposure amount X. In a case where the subject brightness increases (changes from left to right in the graph 401), the imaging apparatus 100 controls the diaphragm in the direction of decreasing the exposure amount Y (arrow 426) when the brightest region (solid line 411) exceeds below the lower limit threshold value (second threshold value) 418 in the graph 401 of the exposure amount X falls below. On the contrary, in a case where the subject brightness decreases (changes from right to left in the graph 401), the imaging apparatus 100 controls the diaphragm in the direction of increasing the exposure amount Y (arrow 430) when the darkest region (broken line 412) exceeds above the upper limit threshold value (first threshold value) 417. The graph 401 in FIG. 4 illustrates four different points (indicated by star signs) where the exposure amount X exceeds the threshold value 417 or 418.

The arrows illustrated in the graph 401 each indicate the transition direction of the exposure amount X, and the arrows illustrated in the graph 402 each indicate the transition direction of the exposure amount Y. For example, the leftmost arrow 420 in the graph 401 indicates the transition direction in which the exposure amount X decreases, and the leftmost arrow 430 in the graph 402 indicates the transition direction in which the exposure amount Y increases. In this case, if the transition amount of the exposure amount X is set equal to the transition amount of the exposure amount Y, the exposure amount Z does not change. This makes it possible to constantly set the exposure amount Z of the imaging apparatus 100 to an exposure amount appropriate for the subject brightness. Although, in this case, it is desirable to correct the exposure amount X in the same frame (step S308), the imaging apparatus 100 may calculate the exposure amount X in the next and subsequent frames after the frame where the diaphragm control is performed without correcting the exposure amount X, and adjusts the exposure amount.

In this manner, in a case where the exposure parameter (exposure amount X) of at least one of a plurality of pixel groups is equal to or larger than the first threshold value, the imaging apparatus 100 controls the diaphragm to reduce the quantity of light incident on the image sensor 102a. Alternatively, in a case where the exposure parameter of at least one of a plurality of pixel groups is equal to or smaller than the second threshold value, the imaging apparatus 100 controls the diaphragm to increase the quantity of light incident on the image sensor 102a.

According to the present exemplary embodiment, as described above, the imaging apparatus 100 controls the diaphragm (diaphragm mechanism 101b) with reference to the exposure amount X, thereby performing diaphragm control that enables image capturing with a proper exposure amount.

Figure 3:
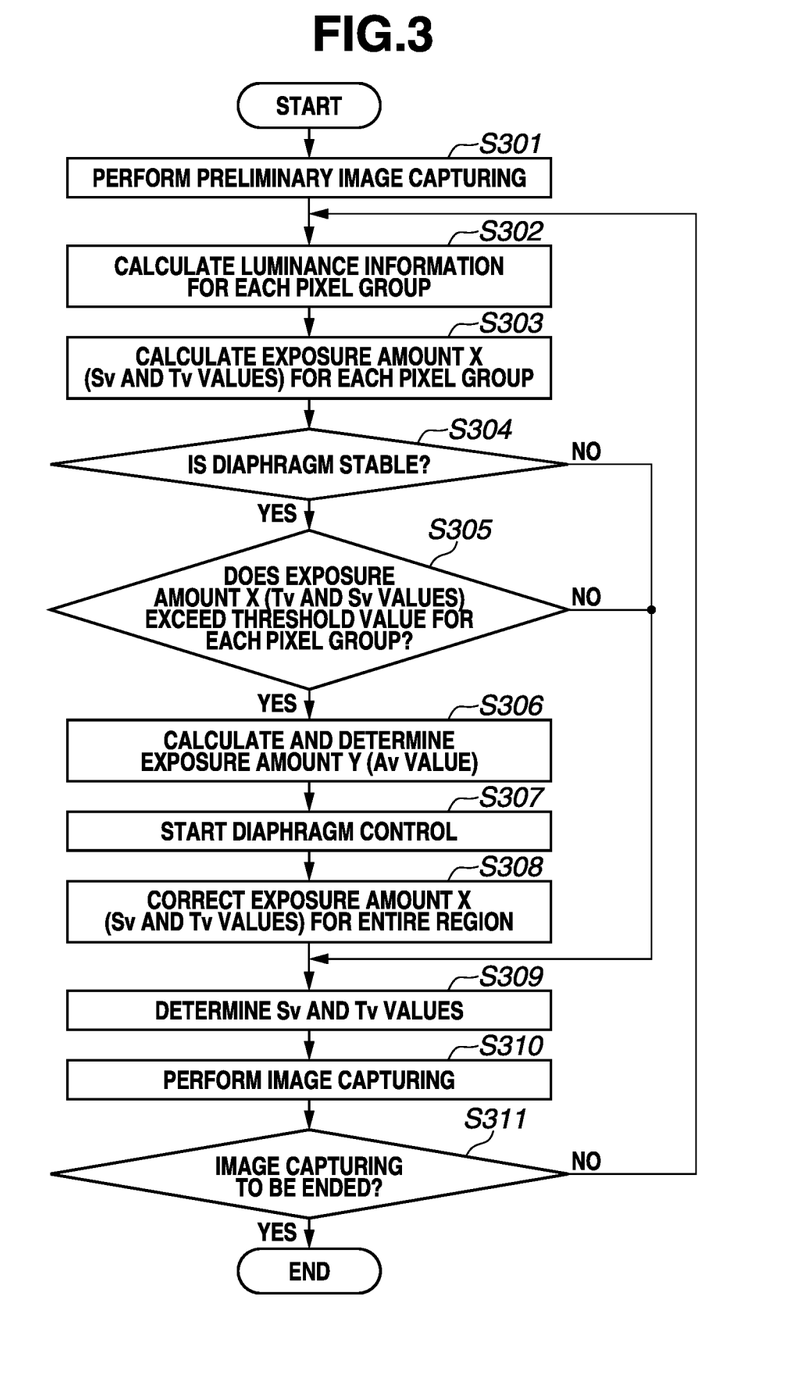
FIG. 3 is a flowchart illustrating an example of an operation of the imaging apparatus according to the first exemplary embodiment.

In a case where the transition time extends across several frames in the diaphragm control, it is desirable to correct the exposure amount X in step S308 in FIG. 3 with reference to the aperture value at the image capture timing. This makes it possible to prevent a hunting phenomenon due to a change in the exposure amount Z during the diaphragm control.

The diaphragm control amount (exposure amount Y) will be described below. When the exposure amount X of the dark region exceeds the upper limit threshold value 417, there may be case where the exposure amount X of the bright region exceeds (below) the lower limit threshold value 418 if the diaphragm control amount is large. Thus, in a case where the diaphragm control is performed when the exposure amount X exceeds the upper limit threshold value 417, the imaging apparatus 100 calculates the difference between the exposure amount X of the bright region and the lower limit threshold value 418.

A hunting phenomenon can be prevented by setting the exposure amount changeable by the diaphragm control to a value smaller than the difference between the exposure amount X of the bright region and the lower limit threshold value 418. Although a case where the exposure amount X exceeds the upper limit threshold value 417 has been described above, the same effect of preventing a hunting phenomenon can be obtained by making the similar setting in a case where the exposure amount X exceeds the lower limit threshold value 418 as in the case where the exposure amount X exceeds the upper limit threshold value 417.

In a case where the diaphragm control amount is small, the exposure amount X keeps exceeding the upper limit threshold value 417. In this case, the imaging apparatus 100 needs to perform the diaphragm control again. Thus, when the exposure amount X of the dark region exceeds the upper limit threshold value 417, it is desirable to set the diaphragm control amount to a value larger than the difference between the maximum value of the exposure amount X and the upper limit threshold value 417. This makes it possible to suppress the frequency of diaphragm control. Although a case where the exposure amount X exceeds the upper limit threshold value 417 has been described above, the same effect of suppressing the frequency of diaphragm control by making the similar setting in a case where the exposure amount X exceeds the lower limit threshold value 418 as in the case where the exposure amount X exceeds the upper limit threshold value 417.

The imaging apparatus 100 may also calculate the diaphragm control amount based on the maximal value of the exposure amount X (darkest region) and the minimal value of the exposure amount X (brightest region) in the pixel group. The imaging apparatus 100 calculates the difference between the median value of the exposure amounts of the darkest and brightest regions (referred to as the "median value of the exposure amounts X") and the median value of the exposure amounts at the upper limit threshold value 417 and the lower limit threshold value 418 (referred to as the "median value of the threshold values"). The median value of the exposure amounts X coincides with the median value of the threshold values if the diaphragm control amount (exposure amount Y) is changed by the difference between the median values of the exposure amounts.

This prevents the exposure amount X from being set near the threshold values 417 and 418, thereby suppressing the frequency of diaphragm control.

To reduce the period of time (the number of frames) until a proper exposure amount is obtained, the imaging apparatus 100 can control the motor for the diaphragm control to operate at a higher speed for a higher frame rate. However, controlling the motor at a higher speed is more likely to cause a hunting phenomenon in the brightness. To prevent a hunting phenomenon in the brightness, there may be case where a limit is set on the transition amount of the exposure amount X. In this case, when performing the diaphragm control, the period of time until a proper exposure amount is obtained can be reduced by alleviating the upper limit of the transition of the exposure amount.

As a method for reducing deviation from the exposure amount during the diaphragm control, the transition amount of the diaphragm per frame may be limited. This makes it possible to reduce the amount of deviation from the exposure amount per frame.

In a case where the exposure amount X cannot be corrected, a hunting phenomenon can be prevented by fixing the exposure amount X to a fixed value without changing the exposure amount X during the diaphragm transition. However, in this case, because the image to be captured is not subjected to proper exposure, it is desirable to correct the captured image to obtain proper exposure using a digital gain. In this case, if the luminance information is saturated (underexposure or overexposure occurs) by changing the exposure amount in the diaphragm control, the exposure amount cannot be corrected using the digital gain. Thus, it is desirable to restrict the transition amount of the diaphragm not to saturate the luminance information.

In a case where the diaphragm control cannot be synchronized with the image capture timing, the exposure amount Y becomes unstable, and thus a hunting phenomenon may occur in exposure. To reduce the period of time in which the hunting phenomenon occurs, it is desirable to set a short transition time and a low transition frequency of the diaphragm.

The limits (upper and lower limit threshold values) of the exposure amount X are determined by the specifications of the image sensor 102a and the imaging apparatus 100. The limits of the exposure amount X are set by the designer of the imaging apparatus 100.

With reference to the graphs in FIG. 4, the description has been described above using examples of the brightest region (the pixel group with the smallest exposure amount) and the darkest region (the pixel group with the largest exposure amount). It is not necessary to refer to the exposure amounts of all pixel groups, but it only needs to compare the pixel group with the largest exposure amount or the pixel group with the smallest exposure amount with the threshold values 417 and 418. This makes it possible to reduce the determination processing.

Although the present exemplary embodiment has been described above centering on an example where the determination is made for each pixel group, the imaging apparatus 100 may collectively calculate the average value for a plurality of pixel groups and compare the calculated average value with the threshold values 417 and 418. This makes it possible to reduce the determination processing. More specifically, the imaging optical system control unit 104 may control the exposure amount to the imaging unit 102 for each region including a plurality of pixel groups.

A predetermined upper limit (threshold value) may be provided for the number of pixel groups of which the exposure amounts exceed the threshold value 417 or 418. The imaging apparatus 100 may perform the diaphragm control in a case where the number of pixel groups of which the exposure amounts exceed the threshold value 417 or 418 is larger than the predetermined upper limit. In other words, in a case where the number of pixel groups each having an exposure parameter equal to or larger than a first threshold value is equal to or larger than a predetermined threshold value, the imaging apparatus 100 controls the diaphragm to reduce the quantity of light incident on the image sensor 102a. Alternatively, in a case where the number of pixel groups each having an exposure parameter equal to or smaller than a second threshold value is equal to or larger than a predetermined threshold value, the imaging apparatus 100 controls the diaphragm to increase the quantity of light incident on the image sensor 102a. This makes it possible to reduce the influence of a light source that illuminates a subject with local and extremely bright light, such as a point light source.

The imaging apparatus 100 also can perform the diaphragm control by combining the above-described control methods. For example, in a case where the exposure parameter of at least one of a plurality of pixel groups is equal to or larger than the first threshold value, and the exposure parameter of at least one of the plurality of pixel groups is equal to or smaller than the second threshold value, the imaging apparatus 100 can control the diaphragm based on the difference or ratio between the number of pixel groups having the exposure parameter equal to or larger than the first threshold value and the number of pixel groups having the exposure parameter equal to or smaller than the second threshold value. This makes it possible to control the diaphragm based on a more dominant exposure amount (depending on which of the number of bright pixel groups and the number of dark pixel groups is greater).

In a case where the exposure amount X of the darkest region exceeds the threshold value 417 and the exposure amount X of the brightest region exceeds the threshold value 418 in an image of one frame, it is desirable to change the exposure amount Y by controlling the diaphragm in the direction in which the luminance information is not saturated with reference to the luminance information. This makes it possible to increase the number of pixel groups that can capture an image with a proper exposure amount within the dynamic range of the imaging unit 102.

There may be provided a limitation on the ratio of the number or size of regions with an exposure amount exceeding the upper limit threshold value 417 to the number or size of regions with an exposure amount exceeding the lower limit threshold value 418. The exposure amount Y may be changed to fall inside the limitation of the ratio. For example, if a limitation is provided such that "bright regions with an exposure amount exceeding the threshold value 418: dark regions with an exposure amount exceeding the threshold value 417"="1:1", it is possible to increase the number of pixel groups that can capture an image with a proper exposure amount within the dynamic range of the imaging unit 102. Further, if a limitation is provided such that "bright regions with an exposure amount exceeding the threshold value 418: dark regions with an exposure amount exceeding threshold value 417"="9:1", the dark regions are unlikely to become saturated and thus become easier to be captured. Further, in a case where top priority is given to the dark regions and the exposure amount X exceeds the upper limit threshold value 417, the exposure amount Y may be increased regardless of the exposure amount of the bright regions. In this case, after changing the exposure amount Y, the exposure amount X keeps exceeding the lower limit threshold value 418 of the exposure amount X as long as the subject brightness remains unchanged. Thus, the imaging apparatus 100 takes measures against a hunting phenomenon related to the diaphragm control. Three different examples of the measures will be described below. The first example of the measures is refraining from making a determination of the diaphragm control for a certain period of time after the diaphragm control. This makes it possible to prevent a hunting phenomenon for the certain period of time. The second example of the measures is setting an upper limit (threshold value) for the number of regions with an exposure amount exceeding the threshold value. A hunting phenomenon can be prevented from occurring immediately after the diaphragm control by setting an upper limit (threshold value) to a value larger than the number of regions with an exposure amount exceeding the threshold value immediately after the diaphragm control. The third example of the measures is performing the diaphragm control with reference to the difference in the exposure amount between the bright regions and the dark regions. The imaging apparatus 100 calculates the difference in the exposure amount between the bright regions and the dark regions. If the difference in the exposure amount decreases, and the subject brightness fits within the dynamic range of the imaging unit 102, the imaging apparatus 100 performs the diaphragm control. This makes it possible to prevent a hunting phenomenon and performing the diaphragm control while prioritizing the dark regions. Although a case is described above in which top priority is given to the dark regions, the imaging apparatus 100 may also change the exposure amount Y in a case where top priority is given to the bright regions.

Although, in the above-described example, the imaging apparatus 100 controls the exposure amount to the imaging unit 102 by using the diaphragm mechanism 101b, the imaging apparatus 100 can also control the exposure amount by using a mechanism for adjusting the quantity of light, such as the ND filter 101c.

As described above, the imaging apparatus 100 according to the present exemplary embodiment adjusts the aperture value (exposure amount Y) based on the exposure period and the analog gain (exposure amount X) so as to adjust the overall exposure amount Z of the imaging apparatus 100, thereby making it possible to perform image capturing with proper exposure.

In a conventional image sensor, a pixel group capturing an image of a dark area captures an image with a high analog gain, resulting in an increase in the amount of noise in a signal. This makes it difficult to distinguish between the signal and the noise. More specifically, it is difficult to determine whether image capturing can be performed with proper exposure based on the luminance information and suitably perform diaphragm transition (adjustment and change). The imaging apparatus 100 according to the present exemplary embodiment sets an upper limit for the analog gain and performs image capturing, thereby making it possible to suitably perform diaphragm transition.

Although, in the first exemplary embodiment, the imaging apparatus 100 controls the diaphragm with reference to the exposure amount X having two different parameters Tv value and Sv value, the imaging apparatus 100 may control the diaphragm with reference to only one parameter (Tv value or Sv value) (exposure parameter). In a case where either the Tv value or the Sv value is fixed, it is not necessary to refer to the parameter. In a case where either one of the Tv value and the Sv value is settable for each pixel group, the imaging apparatus 100 needs to refer to only the parameter settable for each pixel group. Further, in a case where the Tv value and the Sv value are to be increased or decreased while balancing the Tv value and the Sv value, it is predicted that, if either one of the Tv value and the Sv value exceeds the threshold value, the other value is also set to the limit or a value close to the limit. Thus, it is possible to perform image capturing with proper exposure even in a case where the diaphragm control is performed with reference to only one of the Tv value and the Sv value.

In a second exemplary embodiment, the imaging apparatus 100 according to the first exemplary embodiment is used. Components and processing similar to those according to the first exemplary embodiment are assigned the same reference numerals, and detailed descriptions thereof will be omitted. Differences from the first exemplary embodiment will be described below.

Figure 5:
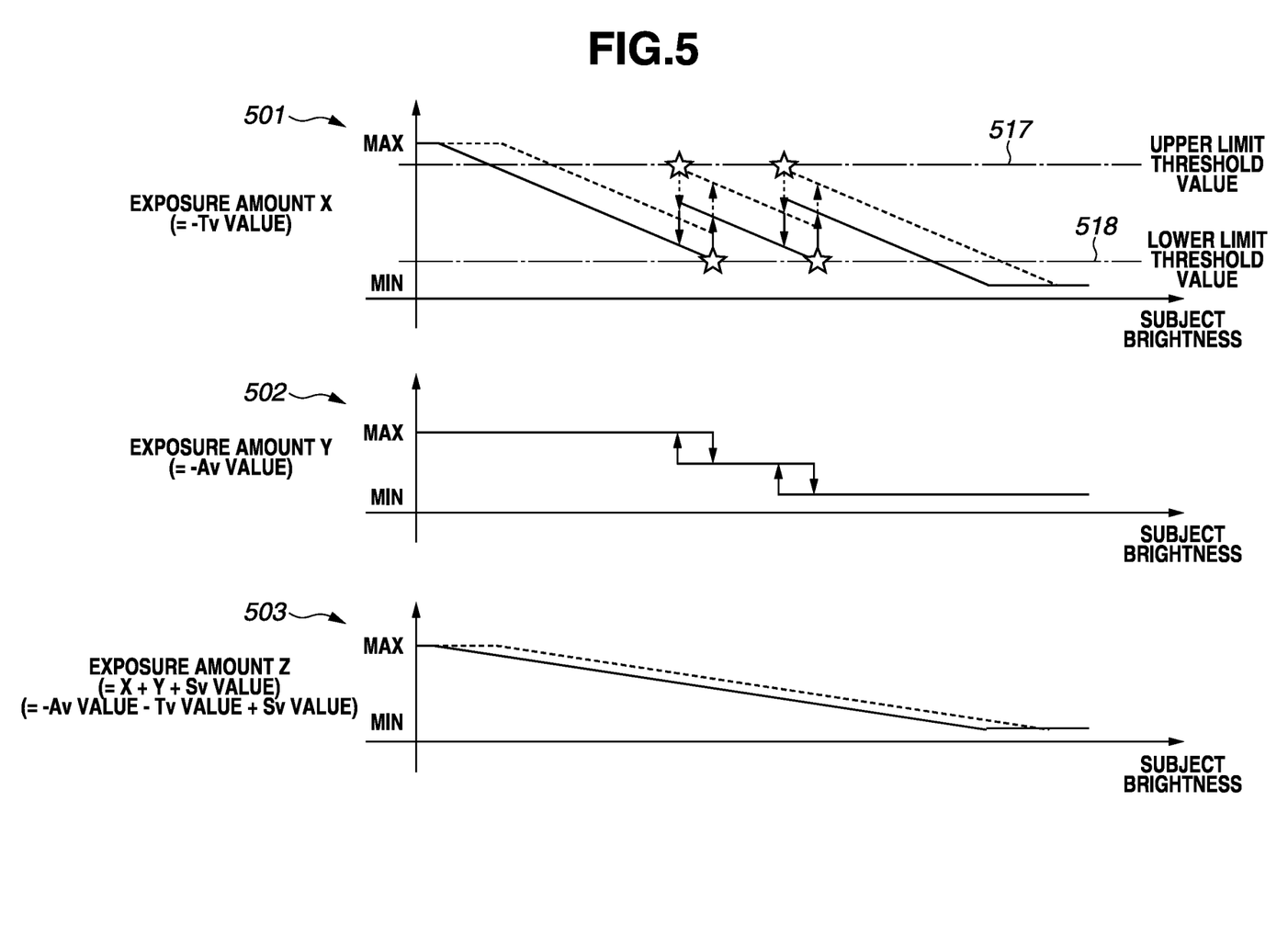
FIG. 5 is a diagram illustrating an example of a relation between an exposure amount and a subject brightness according to a second exemplary embodiment.

A case where the exposure amount X includes only the Tv value as a parameter will be described below with reference to FIG. 5. In a case illustrated in FIG. 5, the imaging apparatus 100 performs the diaphragm control (adjustment of the exposure amount Y) with reference to only the Tv value. A graph 501 in FIG. 5 illustrates a relation between the exposure amount X and the subject brightness. A graph 502 illustrates a relation between the exposure amount Y and the subject brightness. A graph 503 illustrates a relation between the exposure amount Z and the subject brightness.

In the case illustrated in FIG. 5, the exposure amount X equals the −Tv value, and the diaphragm control is performed with reference to only the Tv value of the exposure amount X. An upper limit threshold value (first threshold value) 517 and a lower limit threshold value (second threshold value) 518 are set for the exposure amount X. Like the first exemplary embodiment, the imaging apparatus 100 performs the diaphragm control when the Tv value exceeds the threshold value 517 or 518. However, the exposure amount Z of the imaging apparatus 100 is set to a value obtained by adding the exposure amounts X and Y and then adding the Sv value (Z=X+Y+Sv).

A case where the imaging apparatus 100 performs the diaphragm control with reference to only the Sv value will be described below with reference to FIG. 6.

Figure 6:
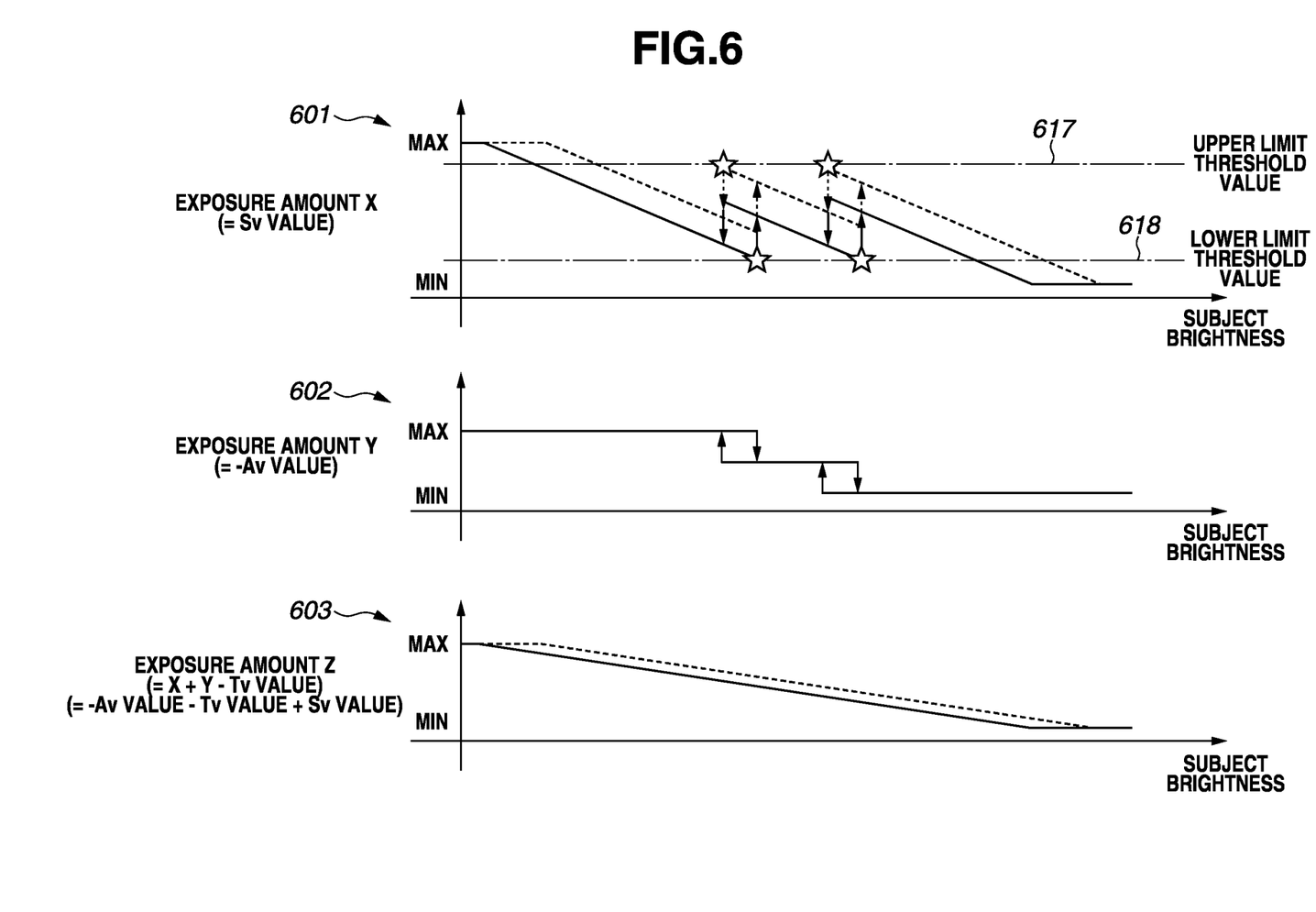
FIG. 6 is a diagram illustrating another example of a relation between an exposure amount and a subject brightness according to the second exemplary embodiment.

A graph 601 in FIG. 6 illustrates a relation between the exposure amount X and the subject brightness. A graph 602 illustrates a relation between the exposure amount Y and the subject brightness. A graph 603 illustrates a relation between the exposure amount Z and the subject brightness.

In a case illustrated in FIG. 6, the exposure amount X equals the Sv value, and the diaphragm control is performed with reference to only the Sv value of the exposure amount X. An upper limit threshold value 617 and a lower limit threshold value 618 are set for the exposure amount X. Like the first exemplary embodiment, the imaging apparatus 100 performs the diaphragm control when the Tv value exceeds the threshold value 617 or 618. However, the exposure amount Z of the imaging apparatus 100 is set to a value obtained by adding the exposure amounts X and Y and then adding the −Tv value (Z=X+Y−Tv).

As illustrated in FIGS. 5 and 6, even in a case where the imaging apparatus 100 refers only to the parameter settable for each pixel group (Tv or Sv value), the imaging apparatus 100 can perform image capturing with a proper exposure amount by suitably changing the diaphragm mechanism 101b.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124336, filed Aug. 3, 2022, which is hereby incorporated by reference herein in its entirety.

What is claimed is:

1. An image capturing apparatus comprising:
   an image sensor configured to set an exposure period and a gain individually for each of a plurality of pixel groups;
   a diaphragm or a neutral density filter configured to adjust a quantity of light incident on the image sensor;
   at least one processor; and
   a memory coupled to the at least one processor, the memory having instructions that, when executed by the at least one processor, causes the at least one processor to function as:
   a first control unit configured to control an exposure parameter including at least one of the exposure period and the gain for each of the plurality of pixel groups; and
   a second control unit configured to control the quantity of light incident on the image sensor by controlling the diaphragm or the neutral density filter based on the exposure parameter controlled by the first control unit,
   wherein, in a case where a number of pixel groups of which the exposure parameter controlled by the first control unit is equal to or larger than a first threshold value is equal to or larger than a predetermined threshold value, the second control unit controls the diaphragm or the neutral density filter to reduce the quantity of light incident on the image sensor.

2. The image capturing apparatus according to claim 1, wherein, in a case where the exposure parameter of at least one of the plurality of pixel groups is equal to or larger than the first threshold value, the second control unit controls the diaphragm or the neutral density filter to reduce the quantity of light incident on the image sensor.

3. The image capturing apparatus according to claim 1, wherein, in a case where the exposure parameter of at least one of the plurality of pixel groups is equal to or smaller than a second threshold value, the second control unit controls the diaphragm or the neutral density filter to increase the quantity of light incident on the image sensor.

4. The image capturing apparatus according to claim 1, wherein, in a case where the exposure parameter of at least one of the plurality of pixel groups is equal to or larger than the first threshold value, and the exposure parameter of at least one of the plurality of pixel groups is equal to or smaller than a second threshold value, the second control unit controls the diaphragm or the neutral density filter based on a ratio of a number of pixel groups of which the exposure parameter is equal to or larger than the first threshold value to a number of pixel groups of which the exposure parameter is equal to or smaller than the second threshold value.

5. The image capturing apparatus according to claim 1, wherein, in a case where the number of pixel groups of which the exposure parameter controlled by the first control unit is equal to or smaller than a second threshold value is equal to or larger than the predetermined threshold value, the second control unit controls the diaphragm or the neutral density filter to increase the quantity of light incident on the image sensor.

6. The image capturing apparatus according to claim 1, wherein, in a case where the number of pixel groups of which the exposure parameter controlled by the first control unit is equal to or larger than a first threshold value is equal to or larger than the predetermined threshold value, and the number of pixel groups of which the exposure parameter controlled by the first control unit is equal to or smaller than a second threshold value is equal to or larger than the predetermined threshold value, the second control unit controls the diaphragm or the neutral density filter based on luminance information about an image captured by the image sensor.

7. A method for controlling an image capturing apparatus, the method comprising:
   controlling, for each of a plurality of pixel groups, an exposure parameter including at least one of an exposure period and a gain of an image sensor configured to set the exposure period and the gain individually for each of the plurality of pixel groups; and
   controlling a quantity of light incident on the image sensor by controlling a diaphragm or a neutral density filter based on the controlled exposure parameter,
   wherein, in a case where a number of pixel groups of which the controlled exposure parameter is equal to or larger than a first threshold value is equal to or larger than a predetermined threshold value, the diaphragm or the neutral density filter is controlled to reduce the quantity of light incident on the image sensor.

8. The method according to claim 7, wherein, in a case where the exposure parameter of at least one of the plurality of pixel groups is equal to or larger than the first threshold value, the diaphragm or the neutral density filter is controlled to reduce the quantity of light incident on the image sensor.

9. The method according to claim 7, wherein, in a case where the exposure parameter of at least one of the plurality of pixel groups is equal to or smaller than a second threshold value, the diaphragm or the neutral density filter is controlled to increase the quantity of light incident on the image sensor.

10. The method according to claim 7, wherein, in a case where the exposure parameter of at least one of the plurality of pixel groups is equal to or larger than the first threshold value, and the exposure parameter of at least one of the plurality of pixel groups is equal to or smaller than a second threshold value, the diaphragm or the neutral density filter is controlled based on a ratio of a number of pixel groups of which the exposure parameter is equal to or larger than the first threshold value to a number of pixel groups of which the exposure parameter is equal to or smaller than the second threshold value.

11. The method according to claim 7, wherein, in a case where the number of pixel groups of which the controlled exposure parameter is equal to or smaller than a second threshold value is equal to or larger than the predetermined threshold value, the diaphragm or the neutral density filter is controlled to increase the quantity of light incident on the image sensor.

12. A non-transitory computer-readable storage medium storing a program for causing a computer to execute the method according to claim 7.

13. The non-transitory computer-readable storage medium according to claim 12, wherein, in a case where the exposure parameter of at least one of the plurality of pixel groups is equal to or larger than the first threshold value, the diaphragm or the neutral density filter is controlled to reduce the quantity of light incident on the image sensor.

14. The non-transitory computer-readable storage medium according to claim 12, wherein, in a case where the exposure parameter of at least one of the plurality of pixel groups is equal to or smaller than a second threshold value, the diaphragm or the neutral density filter is controlled to increase the quantity of light incident on the image sensor.

15. The non-transitory computer-readable storage medium according to claim 12, wherein, in a case where the exposure parameter of at least one of the plurality of pixel groups is equal to or larger than the first threshold value, and the exposure parameter of at least one of the plurality of pixel groups is equal to or smaller than a second threshold value, the diaphragm or the neutral density filter is controlled based on a ratio of a number of pixel groups of which the exposure parameter is equal to or larger than the first threshold value to a number of pixel groups of which the exposure parameter is equal to or smaller than the second threshold value.

16. The non-transitory computer-readable storage medium according to claim 12, wherein, in a case where the number of pixel groups of which the controlled exposure parameter is equal to or smaller than a second threshold value is equal to or larger than the predetermined threshold value, the diaphragm or the neutral density filter is controlled to increase the quantity of light incident on the image sensor.

* * * * *